(12) United States Patent
Mock et al.

(10) Patent No.: US 8,850,925 B2
(45) Date of Patent: Oct. 7, 2014

(54) FOLLOWER MEMBER

(71) Applicant: Schaeffler Technologies AG & Co. KG, Herzogenaurach (DE)

(72) Inventors: Stephan Mock, Pretzfeld (DE); Jochen Viertel, Hochstadt (DE)

(73) Assignee: Schaeffler Technologies GmbH & Co. KG, Herzogenaurach (DE)

(*) Notice: Subject to any disclaimer, the term of this patent is extended or adjusted under 35 U.S.C. 154(b) by 32 days.

(21) Appl. No.: 13/671,923

(22) Filed: Nov. 8, 2012

(65) Prior Publication Data

US 2013/0139640 A1 Jun. 6, 2013

(30) Foreign Application Priority Data

Dec. 1, 2011 (DE) .................... 10 2011 087 557

(51) Int. Cl.
*G05G 1/00* (2008.04)
*F01L 1/18* (2006.01)
*F16H 25/16* (2006.01)
*F02M 39/02* (2006.01)

(52) U.S. Cl.
CPC ............... *F16H 25/16* (2013.01); *F02M 39/02* (2013.01); *F01L 1/18* (2013.01); *F01L 2103/00* (2013.01); *F01L 2105/00* (2013.01); *F01L 1/185* (2013.01)
USPC .......................................................... 74/559

(58) Field of Classification Search
USPC ............... 74/519, 569, 559; 123/90.39, 90.48
See application file for complete search history.

(56) References Cited

U.S. PATENT DOCUMENTS

| 1,964,061 | A | * | 6/1934 | Insley et al. | .................... | 384/475 |
| 5,054,440 | A | * | 10/1991 | Kadokawa | .................... | 123/90.5 |
| 5,598,815 | A | * | 2/1997 | Hertrich | .................... | 123/90.34 |
| 6,035,820 | A | * | 3/2000 | Engelhardt et al. | ......... | 123/90.41 |
| 2012/0291736 | A1 | * | 11/2012 | Moeck | .................... | 123/90.44 |
| 2012/0312264 | A1 | * | 12/2012 | Mock et al. | .................... | 123/90.39 |

FOREIGN PATENT DOCUMENTS

| DE | 10121798 | 11/2002 |
| DE | 102010005606 | 7/2011 |

* cited by examiner

*Primary Examiner* — Vicky Johnson
(74) *Attorney, Agent, or Firm* — Volpe and Koenig, P.C.

(57) ABSTRACT

A follower member (1) for a valve train of an internal combustion engine, the follower member (1) having a roller (3) mounted on a pin (2) for a running contact against a periodic stroke producer, the roller (3) being mounted with an inner peripheral surface (4) on an intermediate ring (5) extending directly on the pin (2) and forming, together with said the (2), an intermediate sliding bearing (6) situated between the intermediate ring (5) and the pin (2), and the intermediate ring (5) protruding beyond two front ends (7) of the roller (3). The intermediate ring (5) has a clearly higher surface hardness than the pin (2).

12 Claims, 2 Drawing Sheets

FOLLOWER MEMBER

INCORPORATION BY REFERENCE

The following documents are incorporated herein by reference as if fully set forth: German Patent Application No. 102011087557.3, filed Dec. 1, 2011.

BACKGROUND

The invention concerns a follower member particularly for a valve train of an internal combustion engine or for a fuel injection pump, said follower member comprising a roller mounted on a pin for a running contact against a periodic stroke producer, said roller being mounted with an inner peripheral surface on an intermediate ring extending directly on said pin and forming, together with said pin, an intermediate sliding bearing situated between said intermediate ring and said pin, and said intermediate ring protruding beyond two front ends of the roller.

A follower member of a generic type, configured in the present case as a finger lever for a sliding cam valve train, is disclosed in FIG. 4 of DE 10 2010 005 606 A1. The mounting arrangement of this finger lever in the region of the pin is subjected to considerably higher loads than conventional valve trains. It can be seen that the intermediate ring protrudes laterally beyond the roller. This measure does indeed reduce the contact pressure in the region of the pin but is inadequate for the entire life duration of the follower member.

SUMMARY

The object of the invention is to provide a follower member of the above-noted type with a mounting arrangement that can withstand high loads over a long operating life.

The invention achieves the above object by the fact that the intermediate ring possesses a clearly higher surface hardness than the pin. In a particularly preferred embodiment of the invention, the roller is seated with an inner peripheral surface directly on the intermediate ring, and the pin is core hardened.

In this way, through simple measures, a follower member is created whose mounting arrangement can efficiently withstand high loads over a long operating life. It is indeed possible for the pin to be only surface hardened, so that a calking of the pin is facilitated. It is, however, preferable to core harden the pin and still calk it laterally, in which case the intermediate ring must possess a still higher surface hardness than the pin through subjection to a heat treatment.

The durability of the mounting arrangement of the follower member is thus further enhanced while, at the same time, by reason of the "double" slide mounting, only a small design space is required, so that, in the case of the follower member being used in a sliding cam valve train, there is no danger during cam lift for the cam that is not switched on to come into contact with the finger lever. The height of the side walls of the finger lever can be kept comparatively small. The costs for the mounting arrangement are accordingly low.

One field of use of the follower member can be related to (variable) valve trains for internal combustion engines as described above. Particularly envisaged in this case is lever-type cam followers, but also cup tappets or roller tappets are included. A further field of use is related to pump tappets for or in injection pumps for diesel oil or gasoline. Further, the scope of protection also includes applications in other fluid pumping devices like hydraulic pumps etc. in which a follower member comes at least indirectly in running contact against a cam, an eccentric or a swash plate or the like.

It is understood that the rolling bearing mounting according to the present invention may protrude beyond the roller only on one side, but a protrusion on both sides is clearly preferred.

As an alternative to a direct mounting of the roller on the ring possessing a high hardness, it is proposed to arrange the roller through its inner peripheral surface on a rolling bearing such as a needle roller bearing on the ring, and to seat this ring on the preferably core hardened pin.

Further developments are related to an advantageous width of the ring or of the ring together with the rolling bearing relative to the width of the roller. In this way, a mounting arrangement is obtained in which the pin is particularly well relieved of load and the roller at the same time requires only a narrow design space.

Further, according to one development of the invention, it is proposed to configure the roller laterally without steps (s. in contrast to this, DE 101 21 798 A1), and this is advantageous, for example, from the manufacturing point of view.

BRIEF DESCRIPTION OF THE DRAWINGS

The invention is disclosed in the drawings which show.

DETAILED DESCRIPTION OF THE PREFERRED EMBODIMENTS

All the figures show a follower member 1 configured as a finger lever for a sliding cam valve train of an internal combustion engine. The follower member 1 comprises a roller 3 with a narrow overall dimension that is mounted on a pin 2 for a running contact against a group of cams. The roller 3 has a non-stepped configuration and thus possesses flat front ends 7.

Figure 3:
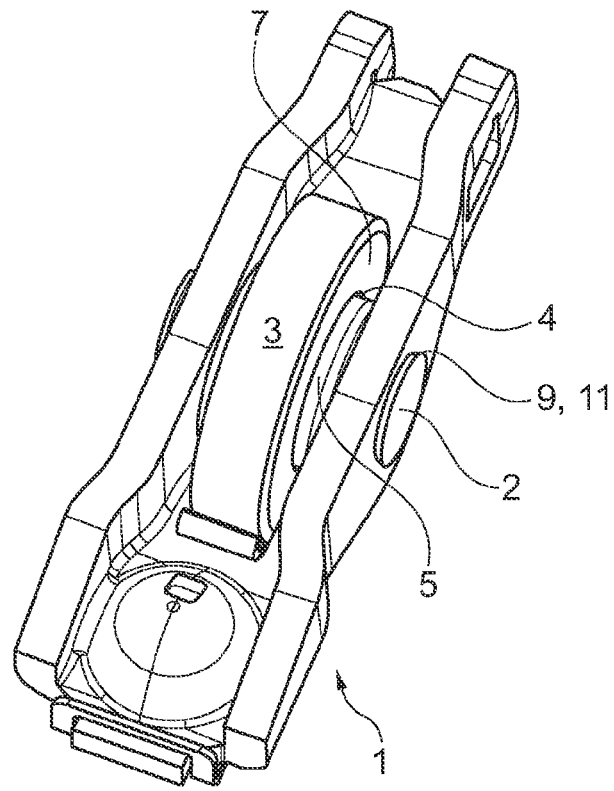
FIG. 3 is a perspective top view of a follower member similar to that of FIG. 1 but comprising a pure slide bearing mounting.
Figure 4:
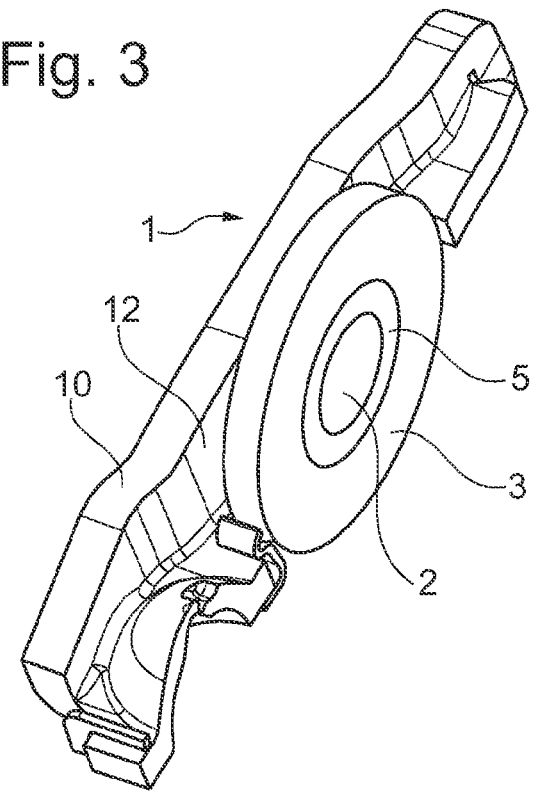
FIG. 4 is a longitudinal section through the follower member of FIG. 3 in a perspective view.

It can be seen that (s. FIGS. 3, 4) the roller 3 is mounted through its inner peripheral surface 4 directly on an intermediate ring 5 which likewise extends directly on the pin 2 thus forming a sliding bearing 6 with the pin 2. In the final analysis, two sliding bearings are thus formed.

As can best be seen in FIG. 3, the intermediate ring 5 extends beyond both front ends 7 of the roller 3 and possesses a higher surface hardness than the core hardened pin 2. The intermediate ring 5 likewise possesses at least a high hardness and, if necessary, the pin 2 may be only surface hardened, as initially described.

As can be seen in the drawing, the pin 2 is seated in bores 9 of vertical side walls 10 of the follower member 1 and is fixed in place through a (hard) calking 11 on both sides.

Figure 1:
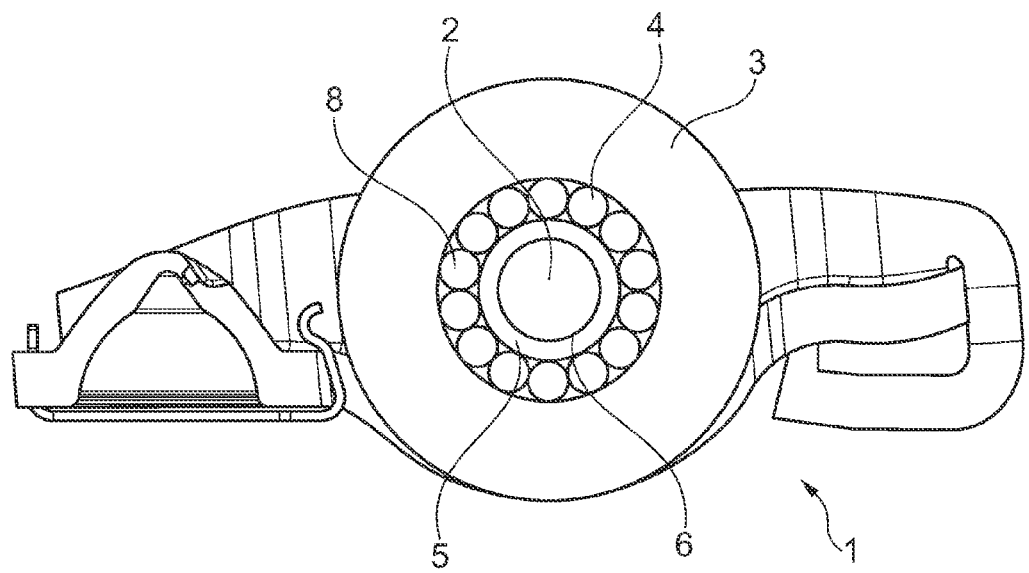
FIG. 1 is a longitudinal section through a follower member configured as a finger lever for a sliding cam valve train, showing a rolling bearing mounting and an intermediate ring.
Figure 2:
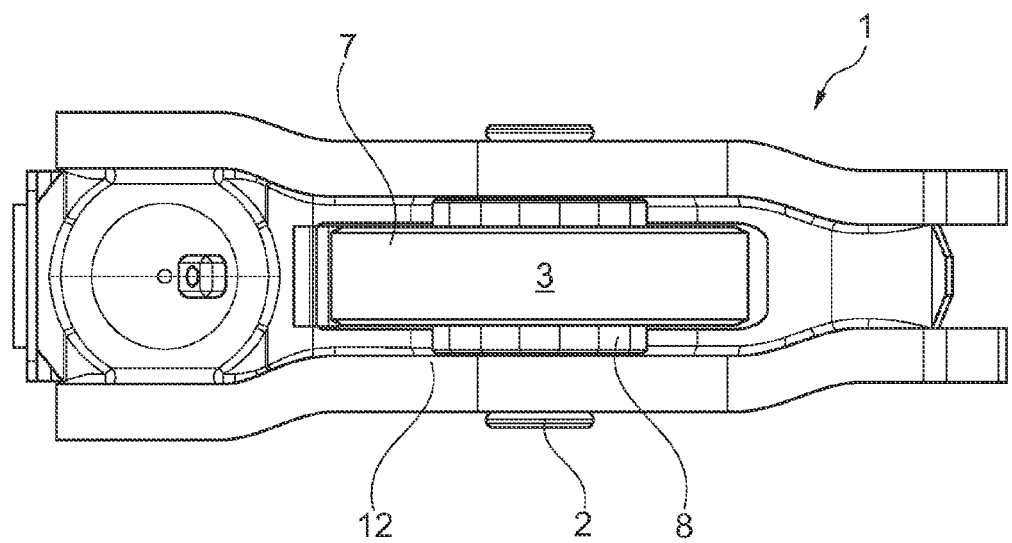
FIG. 2 is a top view of the follower member of FIG. 1.

According to the embodiment of FIGS. 1, 2, the roller 3 extends on the intermediate ring 5 via a rolling bearing 8 which is configured in the present case as a full complement needle roller bearing. The rolling bearing 8 protrudes together with the intermediate ring 5 beyond the front ends 7 of the roller 3. The pin 2 is likewise core hardened, and the intermediate ring 5 again possesses a higher hardness than the pin 2.

The invention claimed is:

1. A follower member for a valve train of an internal combustion engine or for a fuel injection pump, said follower member comprising a roller mounted on a pin for a running contact against a periodic stroke producer, said roller being mounted with an inner peripheral surface on an intermediate ring extending directly on said pin and forming, together with said pin, an intermediate sliding bearing situated between said intermediate ring and said pin, and said intermediate ring protruding beyond two front ends of the roller, the intermediate ring has a higher surface hardness than the pin.

2. A follower member according to claim 1, wherein the pin is completely core hardened.

3. A follower member according to claim 1, wherein the roller is mounted with the inner peripheral surface directly on the intermediate ring.

4. A follower member according to claim 3, wherein the intermediate ring is broader than the roller by 30% to 60%.

5. A follower member according to claim 1, wherein the roller is mounted on the intermediate ring via a rolling bearing, and said rolling bearing, protrudes beyond the front ends of the pin.

6. A follower member according to claim 5, wherein the rolling bearing is a needle roller bearing.

7. A follower member according to claim 5, wherein the intermediate ring together with the rolling bearing is broader than the roller by 30% to 60%.

8. A follower member according to claim 1, wherein the pin is lodged in bores of substantially vertical side walls of the follower member and is fixed in place through a one-sided or a two-sided front end calking.

9. A follower member according to claim 1, wherein the roller has flat front ends.

10. A follower member according to claim 1, wherein the follower member is configured as a finger lever for a variable sliding cam valve train.

11. A follower member according to claim 1, wherein the follower member is configured as a finger lever for a variable sliding cam valve train, and the intermediate ring extends laterally in front of inner surfaces of substantially vertical side walls of the follower member.

12. A follower member according to claim 1, wherein the follower member is configured as a finger lever for a variable sliding cam valve train and the intermediate ring and the rolling bearing extend laterally in front of inner surfaces of substantially vertical side walls of the follower member.

* * * * *